United States Patent
Sun et al.

(10) Patent No.: US 7,817,822 B2
(45) Date of Patent: Oct. 19, 2010

(54) BI-DIRECTIONAL TRACKING USING TRAJECTORY SEGMENT ANALYSIS

(75) Inventors: Jian Sun, Beijing (CN); Weiwei Zhang, Beijing (CN); Xiaoou Tang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1210 days.

(21) Appl. No.: 11/380,635

(22) Filed: Apr. 27, 2006

(65) Prior Publication Data

US 2007/0086622 A1   Apr. 19, 2007

Related U.S. Application Data

(60) Provisional application No. 60/727,119, filed on Oct. 14, 2005.

(51) Int. Cl.
G06K 9/00 (2006.01)
(52) U.S. Cl. .................. 382/103; 382/173; 382/154; 382/143; 382/131; 348/103
(58) Field of Classification Search .............. 382/103, 382/168, 291, 162, 203, 209, 218, 242; 348/169, 348/218, 699, 703
See application file for complete search history.

(56) References Cited

U.S. PATENT DOCUMENTS

| | | | |
|---|---|---|---|
| 6,295,367 B1 * | 9/2001 | Crabtree et al. | 382/103 |
| 6,590,999 B1 * | 7/2003 | Comaniciu et al. | 382/103 |
| 6,724,915 B1 * | 4/2004 | Toklu et al. | 382/103 |
| 6,795,567 B1 * | 9/2004 | Cham et al. | 382/103 |
| 7,094,164 B2 * | 8/2006 | Marty et al. | 473/416 |
| 7,194,120 B2 * | 3/2007 | Wicker et al. | 382/128 |
| 7,397,242 B2 * | 7/2008 | Samsonov et al. | 324/309 |
| 7,483,572 B2 * | 1/2009 | Porikli | 382/215 |

(Continued)

FOREIGN PATENT DOCUMENTS

EP   0942395   9/1999

(Continued)

OTHER PUBLICATIONS

PCT Notification with Search Report and Written Opinion dated Mar. 7, 2007, from counterpart PCT patent application, International Application No. PCT/US2006/040136, copy attached, 10 pages.

(Continued)

*Primary Examiner*—Wes Tucker
*Assistant Examiner*—Nancy Bitar
(74) *Attorney, Agent, or Firm*—Lee & Hayes, PLLC

(57) ABSTRACT

The present video tracking technique outputs a Maximum A Posterior (MAP) solution for a target object based on two object templates obtained from a start and an end keyframe of a whole state sequence. The technique first minimizes the whole state space of the sequence by generating a sparse set of local two-dimensional modes in each frame of the sequence. The two-dimensional modes are converted into three-dimensional points within a three-dimensional volume. The three-dimensional points are clustered using a spectral clustering technique where each cluster corresponds to a possible trajectory segment of the target object. If there is occlusion in the sequence, occlusion segments are generated so that an optimal trajectory of the target object can be obtained.

18 Claims, 14 Drawing Sheets

U.S. PATENT DOCUMENTS

2003/0053661 A1 * 3/2003 Magarey .................... 382/103

FOREIGN PATENT DOCUMENTS

EP 0942395 A2 * 9/1999
JP 2002074368 3/2002

OTHER PUBLICATIONS

A. Agarwala, et al., "Keyframe-Based Tracking for Rotoscoping and Animation", in Proceedings of SIGGRAPH 2004, 2004, pp. 584-591, USA.

A. Y. Ng et al., "On Spectral Clustering: Analysis and an algorithm", NIPS, 2002, 8 pages, USA.

B. D. Lucas et al., "An Iterative Image Registration Technique with an Application to Stereo Vision", Proceedings of Imaging Understanding Workshop, 1981, pp. 121-130, USA.

D. Comaniciu, et al., "Real-Time Tracking of Non-Rigid Objects using Mean Shift", CVPR, 2000, 8 pages, USA.

D. B. Reid, "An Algorithm for Tracking Multiple Targets", IEEE Tran. on Automatic Control, Dec. 1979, pp. 843-854, vol. AC-24, No. 6, USA.

G. D. Hager et al., "Efficient Region Tracking With Parametric Models of Geometry and Illumination", IEEE Tran. on PAMI, Oct. 1998, pp. 1025-1039, vol. 20, No. 10, USA.

I. Cox, et al., "An Efficient Implementation of Reid's Multiple Hypothesis Tracking Algorithm and its Evaluation for the Purpose of Visual Tracking", IEEE Tran. on PAMII, 1996, pp. 138-150, USA.

J. MacCormick et al., "A probabilistic exclusion principle for tracking multiple objects", ICCV, 1999, 7 pages, UK.

J. S. Liu et al., "Sequential Monte Carlo Methods for Dynamic Systems", Journal of American Statistical Association, Sept 1998, pp. 1032-1044, vol. 93, No. 443.

L. Torresani et al., "Space-Time Tracking", ECCV, 2002, 12 pages, USA.

M. Brand, et al., "A unifying theorem for spectral embedding and clustering", Proceedings of Inte. Conf. on AI and Statistics, 2003, 8 pages, USA.

M. Han et al., "An Algorithm for Multiple Object Trajectory Tracking", CVPR, 2004, 8 pages, USA.

M. Irani, "Multi-Frame Optical Flow Estimation Using Subspace Constraints", ICCV, 1999, 8 pages, Israel.

M. Isard et al., "Contour tracking by stochastic propagation of conditional density", ECCV, 1996, pp. 343-356, Cambridge, UK.

N. J. Gordon, et al., "Novel approach to nonlinear/non-Gaussian Bayesian state estimation", IEE Proceedings on Radar and Signal Processing., Apr. 1993, pp. 107-113, vol. 140, No. 2, London, UK.

P. Perez et al., "Color-Based Probabilistic Tracking", ECCV, 2002, pp. 661-675.

S. Birchfield, "Elliptical Head Tracking Using Intensity Gradients and Color Histograms", CVPR, 1998, 6 pages, USA.

* cited by examiner

BI-DIRECTIONAL TRACKING USING TRAJECTORY SEGMENT ANALYSIS

RELATED APPLICATIONS

This application claims priority under 35 U.S.C. §119(e) to U.S. Provisional Application No. 60/727,119 filed Oct. 14, 2005.

BACKGROUND

Visual tracking of specified objects (i.e., target objects) is an area of computer vision that has many useful applications. For example, visual tracking may be used in video surveillance, human-computer interfaces, digital video editing, and the like. In general, visual tracking tracks a target object during a given observation, such as a video sequence. Unfortunately, visual tracking techniques have difficulty tracking target objects in several situations.

For example, one situation where visual tracking techniques have difficulty tracking the target object occurs when the target object experiences sudden motion, such as from an unexpected dynamic change of the target object itself or from an abrupt motion of the camera. Another situation where visual tracking techniques have difficulty occurs when a similar looking object is in close proximity to the target object. In this situation, tracking techniques have difficulty distinguishing which of the two objects is the target object. Visual tracking is also difficult when occlusion occurs and the target object is partially or completely hidden by another object.

In overview, most tracking techniques use recursive estimation to estimate a location of a target object at a current time t based on observations up to the time t. In a Bayesian framework, the tracking problem is commonly formulated as a recursive estimation of a time-evolving posterior distribution $P(x_t|y_{1:t})$ of state $x_t$ given all the observations $y_{1:t}$, such that:

$$P(x_{t+1}|y_{1:t+1}) \sim P(y_{t+1}|x_{t+1}) \int_{dx_t} P(x_{t+1}|x_t) P(x_t|y_{1:t}). \quad (1)$$

Recursive estimation has two major advantages: 1) efficient computation; and 2) natural fit with real-time or on-line tracking applications.

However, many real world applications fit in the category of offline tracking, such as event statistics in video surveillance, object-based video compression, home video editing, video annotation, visual motion capture, and the like. Therefore, the recursive approach has also been applied to offline visual tracking. When this is done, the long input video sequence is typically first decomposed into short sequences by specifying one or more keyframes. The specified keyframes can be any of the frames within the video sequence. Each keyframe contains an object template which designates the object to be tracked (i.e., the target object). Visual tracking using these decomposed short sequences is commonly referred to as keyframe-based tracking. The recursive approach is then applied to each of the short sequences in either the forward or backward direction. This approach, however, typically fails somewhere in the middle of the sequence. When this occurs, another keyframe is added at the failed location.

While adding new keyframes improves the outcome of the visual tracking, adding new keyframes in a trial-and-error manner is prohibitively time consuming. Thus, there is a continual need to improve upon the tracking techniques used in offline applications.

SUMMARY

The present video tracking technique outputs a Maximum A Posterior (MAP) solution for a target object based on two object templates obtained from a start and an end keyframe of a whole state sequence. The technique first minimizes the whole state space of the sequence by generating a sparse set of local two-dimensional modes in each frame of the sequence. The two-dimensional modes are converted into three-dimensional points within a three-dimensional volume. The three-dimensional points are clustered using a spectral clustering technique where each cluster corresponds to a possible trajectory segment of the target object. If there is occlusion in the sequence, occlusion segments are generated so that an optimal trajectory of the target object can be obtained.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments are described with reference to the following figures, wherein like reference numerals refer to like parts throughout the various views unless otherwise specified. For convenience, the left-most digit of a reference number identifies the particular Figure in which the reference number first appears.

DETAILED DESCRIPTION

The following description is directed at a video tracking technique that outputs a maximum a posterior (MAP) solution for a target object based on two object templates obtained from a start and an end keyframe of a whole state sequence. In overview, the technique first minimizes the whole state space of the sequence by generating a sparse set of local two-dimensional modes in each frame of the sequence. The two-dimensional modes are converted into three-dimensional points within a three-dimensional volume. The three-dimensional points are clustered using a spectral clustering technique where each cluster corresponds to a possible trajectory segment of the target object. If there is occlusion in the sequence, occlusion segments are generated so that an optimal trajectory of the target object can be obtained. The present video tracking technique handles sudden motion, ambiguity, and short/long periods of occlusion. These and other aspects of the present video tracking technique are now described in detail.

Figure 1:
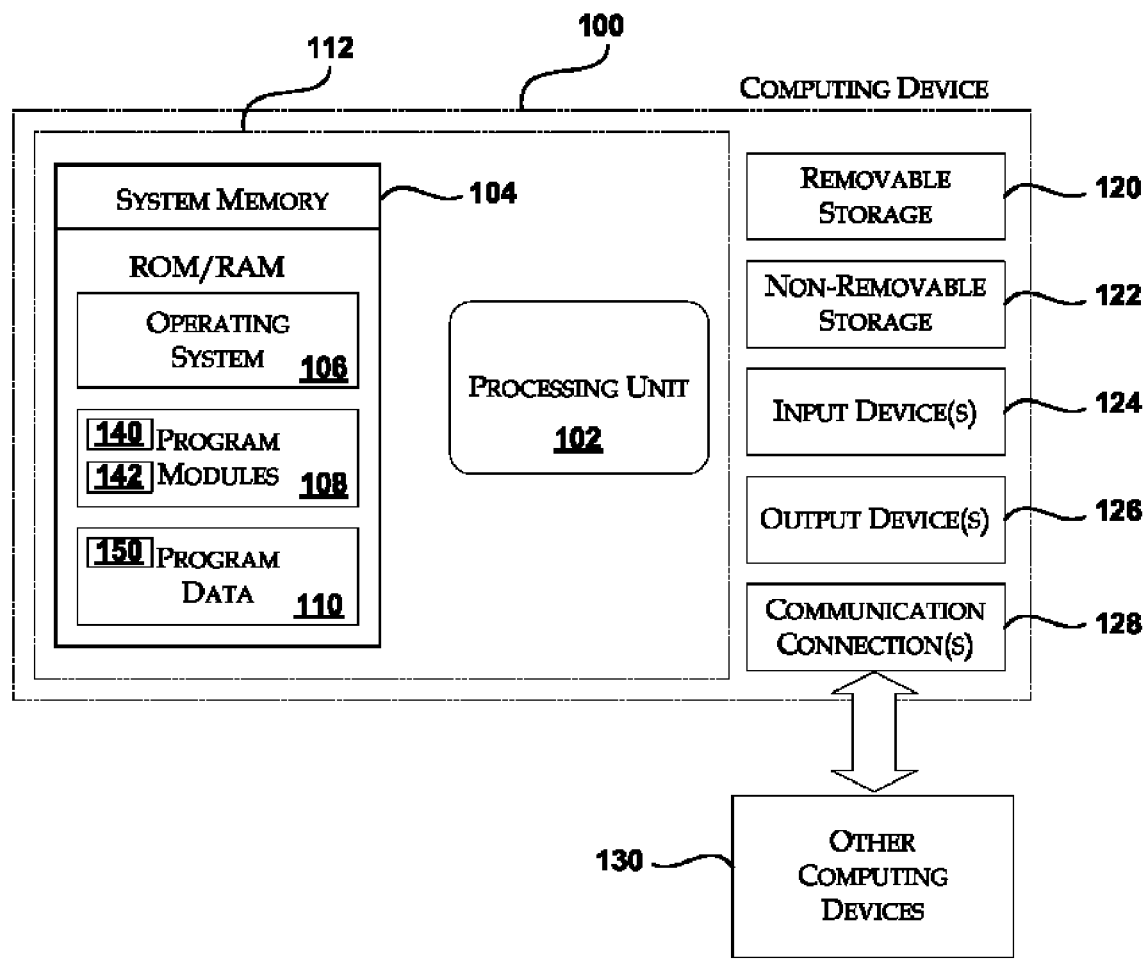
FIG. 1 is an illustrative system that may be used to implement the video tracking technique described herein in accordance with one embodiment.

FIG. 1 is an illustrative system that may be used to implement the video tracking technique described herein in accordance with one embodiment. The system includes a computing device, such as computing device 100. Computing device 100 represents any type of computing device such as a personal computer, a laptop, a server, a game console, a handheld or mobile device (e.g., a cellular phone, digital assistant), and the like. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 106, one or more program modules 108, and may include program data 110. For the present video tracking technique, the program modules 108 may include one or more components 140 for implementing the video tracking technique. In addition, program modules 108 may include a graphics application 142 that utilizes the video tracking technique implemented within components 140. Alternatively, the operating system 106 may include one or more components for implementing the video tracking technique. Program data 110 may include a video sequence 150. This basic configuration is illustrated in FIG. 1 by those components within dashed line 112.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 120 and non-removable storage 122. Computer storage media may include volatile and nonvolatile, removable and non-removable media implemented in any method or technology for storage of information, such as computer readable instructions, data structures, program modules, or other data. System memory 104, removable storage 120 and non-removable storage 122 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100.

Computing device 100 may also have input device(s) 124 such as keyboard, mouse, pen, voice input device, touch input device, etc. Computing device 100 may also contain communication connections 128 that allow the device to communicate with other computing devices 130, such as over a network. Communication connection(s) 128 is one example of communication media. Communication media may typically be embodied by computer readable instructions, data structures, program modules, or other data. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Before describing the details of the present tracking technique, a state model and observation model for the present tracking technique will be described. The state model and observation model apply a keyframe-based framework. For the state model, a target object is represented as a rectangle $R=\{p,s*\hat{\omega},s*\hat{h}\}$, where p is the center rectangle and s is the scaling factor, $\hat{\omega}$ and $\hat{h}$ are a fixed width and height of the object template, respectively. The state of the object is denoted as $x=\{p,s\}\in\chi$, where $\chi 0$ is the state space. State $x_1$ refers to the state in the first keyframe $I_1$ and the state $X_T$ refers to the state in the last keyframe $I_T$. For the present tracking technique, both of these states $x_1$ and $X_T$ are known.

The observation model is the color statistics of the target object. The object's color model is represented as a histogram $h=\{h_1,h_H\}$ with H (typically, $H=8\times8\times8$) bins in RGB color space. The Bhattacharyya distance between the associated histogram $h(x_0)$ of the state $x_0$ and the associated histogram $h(x_t)$ of the state $x_t$ is defined as follows:

$$B^2[h(x_0), h(x_i)] = 1 - \sum_{j=1}^{B} \sqrt{h_j(x_0)h_j(x_i)}. \qquad (2)$$

This model captures global color statistics. In another embodiment, a more sophisticated multi-part color model may be used if there is a certain spatial configuration of the target object. For example, in one implementation a multi-part color model such as the color model described in *Proc. European Conf on Computer Vision*, volume 1, pages 611-675, 2002, by Patrick Perez, C. Hue, J. Vermaak, and M. Gangnet, is utilized.

For trajectory optimization, the posterior of the whole state sequence $X=\{x_2, \Lambda, x_{T-1}\}$ for a given video sequence or observation $Y=\{y_1, \Lambda, y_T\}$ and known two states $\{x_1, x_T\}$ can be represented as follows under the first order Markov independence assumption:

$$P(X|Y, x_1, x_T) = \frac{1}{Z} \prod_{i=2}^{T-1} \psi(y_i|x_i, x_1, x_T) \prod_{i=1}^{T-1} \psi(x_i, x_{i+1}), \qquad (3)$$

where the local evidence $\psi(y_i|x_i, x_1, x_T)$ is defined using the Bhattacharyya distance as follows:

$$\psi(y_i|x_i, x_1, x_T) \sim \exp(-\min\{B^2[h(x_i)], B^2[h(x_i), h(x_T)]\}/2\sigma_h^2) \qquad (4)$$

where $\sigma_k^2$ is a variance parameter. The variance parameter measures the similarity between the color histogram $h(x_i)$ of the state $x_i$ to the closest color histogram between $h(x_1)$ in the keyframe $I_1$ or $h(x_T)$ in the keyframe $I_T$. The potential function $\psi(x_i, x_{i-1})$ between two adjacent states is defined as:

$$\psi(x_i, x_{i+1}) \sim \exp(-D[x_i, x_{i+1}]/2\delta_p^2), \qquad (5)$$

where $D[x_i, x_{i+1}] = \|p_i + p_{i+1}\|^2 + \beta \|s_i + s_{i+1}\|^2$ is the similarity between state $x_i$ and $x_j$. Parameter $\sigma_p$ is a variance parameter that controls the strength of smoothness and $\beta$ is a weight between location difference and scale difference. Thus, $\beta$ is a smoothness constraint on the whole trajectory $X'=\{X_0, \ldots, X_T\}$ of the target object.

The goal of the keyframe-based tracking is to obtain the MAP solution of Equation (3) as follows:

$$X^* = \arg\max P(X|Y). \qquad (6)$$

However, the complexity O of determining the MAP solution is $O(N^2T)$, where N is the number of discrete states in one frame and T is the frame number of the input video. Thus, for a 320×240 video, the quantized state space is still very large even for the present state representation. Therefore, the present bidirectional tracking technique focuses on reducing the state space in an effective and efficient manner.

Figure 2:
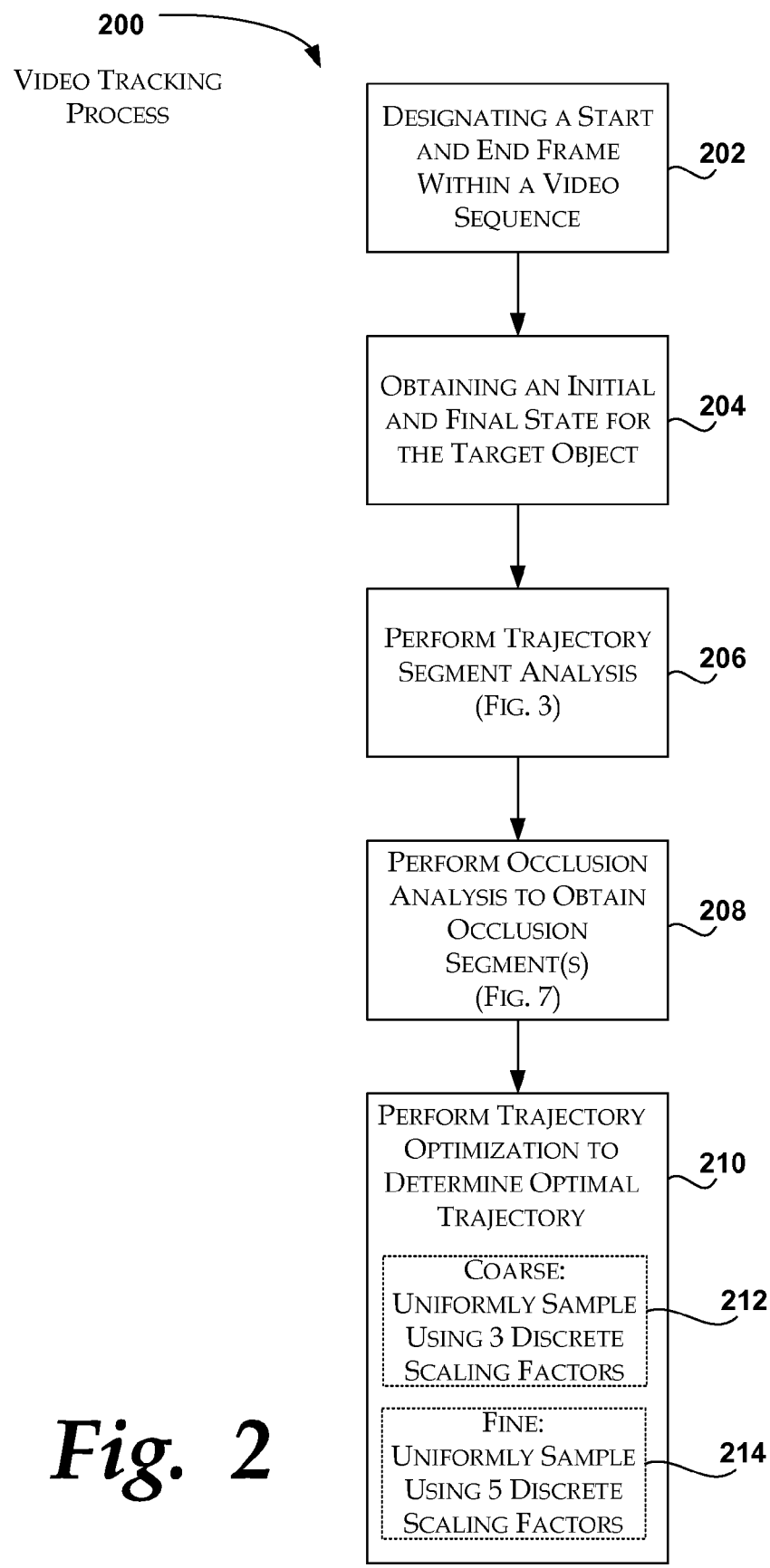
FIG. 2 is a flow diagram illustrating an exemplary video tracking process that effectively reduces the state space so that the MAP solution can be efficiently obtained in accordance with one embodiment.

FIG. 2 is a flow diagram illustrating an exemplary video tracking process 200 that effectively reduces the state space so that the MAP solution can be efficiently obtained. The video tracking process begins at block 202 where a start and an end frame are designated within a video sequence. The start and end frames are referred to as keyframes. Processing continues at block 204.

At block 204, an initial state for the target object is obtained from within the start frame and a final state for the target object is obtained from within the end frame. The initial state and final state may be selected by a user. For example, the user may place a rectangle around the target object. The initial state and final state are then determined based on the location of the rectangle within the frame. Processing continues at block 206.

At block 206, trajectory segment analysis is performed. Briefly, trajectory segment analysis, described in detail later in conjunction with FIG. 3, attempts to identify positions (i.e., modes) within in a video sequence where the target object most likely exists. For efficiency, the trajectory segment analysis first combines a two-dimensional mode extraction to find the most likely positions for the target object and then applies a three-dimensional trajectory extraction at these identified positions. Processing continues at block 208.

At block 208, occlusion analysis is performed. Briefly, occlusion analysis, described in detail later in conjunction with FIG. 7, attempts to remove the discontinuities caused by occlusion. This allows the complete trajectory of the target object to be tracked. Processing continues at block 210.

At block 210, trajectory optimization is performed. After getting a set of trajectory segments (block 206) and occlusion segments (block 208), a single optimal trajectory between two keyframes is computed by trajectory optimization. Briefly, the trajectory optimization, described in detail later, is performed in a coarse-to-fine manner in order to obtain more accurate tracking results. In one embodiment of the coarse trajectory optimization process, states around the computed segments are uniformly sampled using three discrete scaling factors in each frame to determine an optimal trajectory. In one embodiment of the fine trajectory optimization process, states around the optimal trajectory are sampled using five discrete scaling factors in each frame. Each of these blocks will now be described in greater detail.

Figure 3:
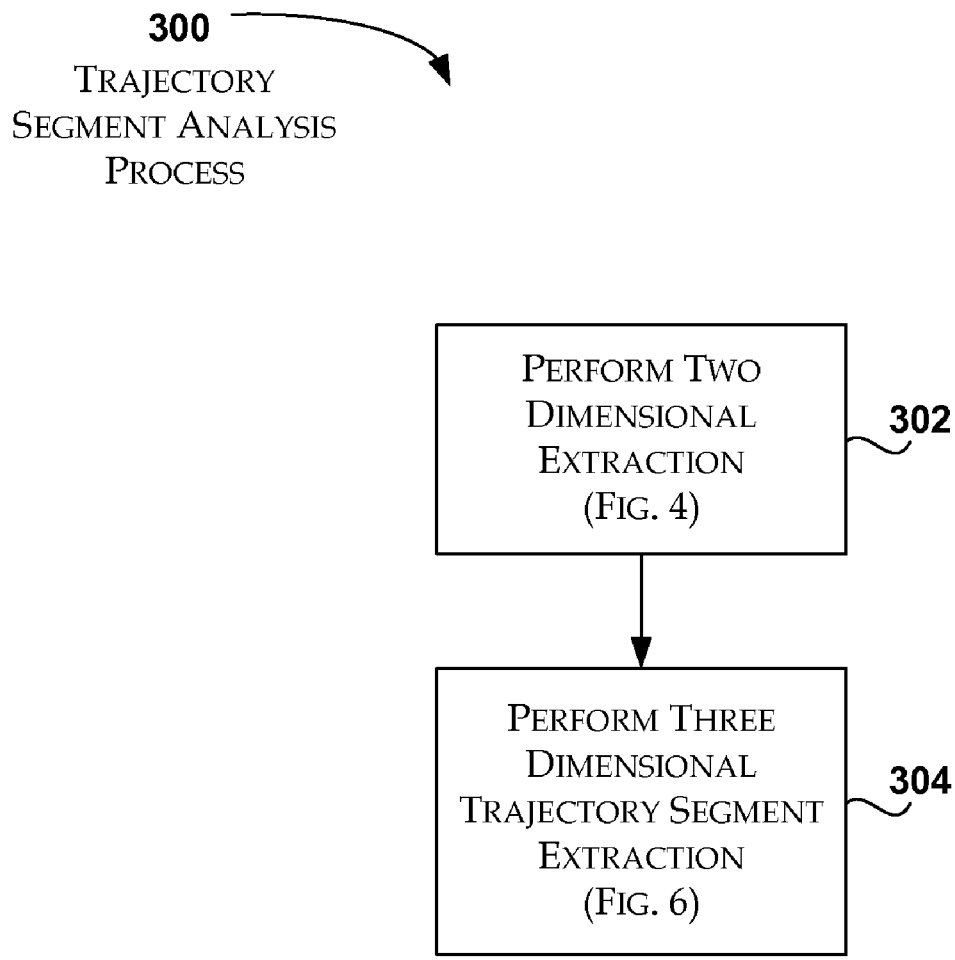
FIG. 3 is a flow diagram illustrating an exemplary trajectory segment analysis process suitable for use in the video tracking process of FIG. 2 in accordance with one embodiment.

FIG. 3 is a flow diagram illustrating an exemplary trajectory segment analysis process 300 suitable for use in the video tracking process of FIG. 2. The trajectory segment analysis process 300 begins at block 302 where a two-dimensional extraction is performed in each frame. Briefly, the two-dimensional extraction process, described in detail later in conjunction with FIG. 4, attempts to significantly reduce the whole state space so that tracking can be performed on a more sparse state set. Processing continues at block 304.

At block 304, after the state space has been reduced, a small number of three-dimensional trajectory segments are determined. In overview, the two-dimensional modes need to be converted into three-dimensional space in order to obtain the true trajectory for the target object. Briefly, the three-dimensional trajectory segment extraction process, described in detail later in conjunction with FIG. 6, attempts to extract a number of trajectory segments from all points where the segment represents a fraction of a meaningful trajectory. The trajectory segment extraction process attempts to obtain the longest possible length for each segment and/or the smallest number of segments possible. The present video tracking technique applies a spectral clustering technique to obtain these three-dimensional trajectory segments. Once these trajectory segments are extracted, process 300 is complete. Both of these blocks 302 and 304 will now be described in further detail.

Figure 4:
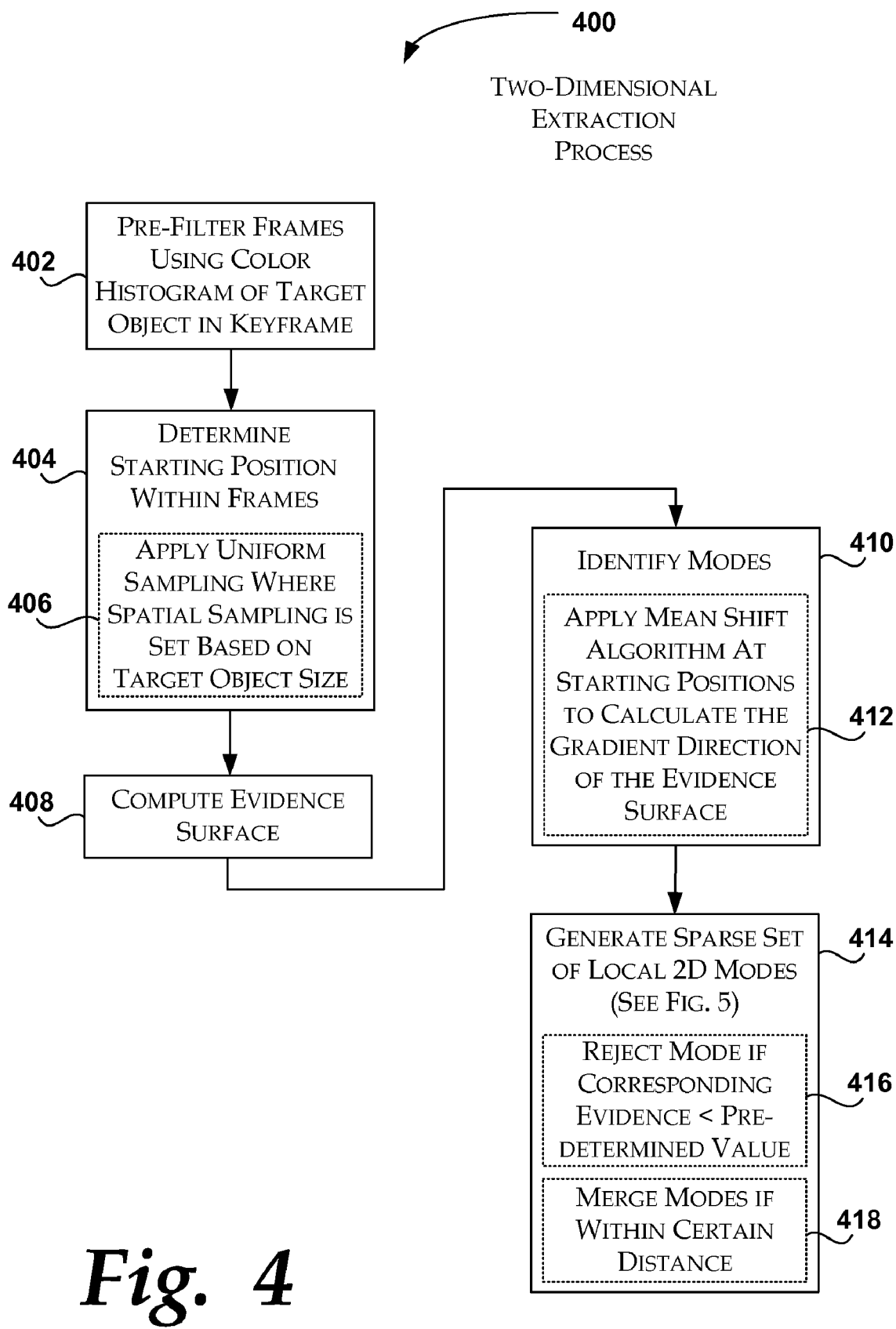
FIG. 4 illustrates a flow diagram of a two-dimensional extraction process that is performed for each frame independently in accordance with one embodiment. This process is suitable for use in the trajectory segment analysis process of FIG. 3.

FIG. 4 illustrates a flow diagram of a two-dimensional extraction process 400 suitable for use in block 302 of process 300 shown in FIG. 3. Process 400 is performed for each frame independently. Two-dimensional extraction process 400 begins at block 402 where frames are pre-filtered using a color histogram of the objects in the keyframes so that fewer samples are used. Processing continues at block 404.

At block 404, one embodiment of the present tracking technique obtains a set of starting positions within each frame. The starting positions are determined by uniformly sampling locations in the frame. Scaling may be performed using 3-5 discrete levels. In a further refinement (block 406), the spatial sampling interval is set based on the target object size. For example, the spatial sampling interval may be set slightly smaller than half the size of the target object. Processing continues at block 408.

At block 408, an evidence surface is computed. In one embodiment, the local evidence $\psi(y_i|x_i,x_1,x_T)$ is defined using a Bhattacharyya distance. The evidence surface is then computed using the following equation:

$$\psi(y_i|x_i,x_1,x_T) \sim \exp(-\min\{B^2[h(x_i),h(x_1)], B^2[h(x_i),h(x_T)]\}/2\sigma_h^2). \quad (7)$$

The parameter $\sigma_h^2$ is a variance parameter. The Bhattacharyya distance measures the similarity between the color histogram $h(x_i)$ of the state $x_i$ to the closest color histogram between $h(x_1)$ in the keyframe $I_1$ or $h(X_T)$ in the keyframe $I_T$. Processing continues at block 410.

At block 410, modes are identified based on the evidence surface. In overview, the most likely positions (i.e., modes) are peaks (i.e., local maxima) on the evidence surface. Each "mostly likely" 2D mode represents a state x' whose observation is similar to the object template in the keyframes. In other words, the local evident $\psi(y|X',X_1,X_T)$ is high. To efficiently find these modes, one embodiment (block 412) utilizes a mean shift algorithm which is a nonparametric statistical method for seeking the nearest mode of a point sample distribution. In overview, given an initial location, the mean shift algorithm computes a gradient direction of a convoluted evidence surface by a kernel G using the following equation:

$$\Delta p = \frac{\sum_q G(q-p)w(q)(q-p)}{\sum_q G(q-p)w(q)}. \quad (8)$$

Thus, given an initial location p in the image, the mean shift computes new location $p'=p+\Delta p$ according to the above equation, where G is a kernel function and summations are performed over pixels q in the object's rectangle. The mean shift vector $\Delta p$ opposites to the gradient direction of a convolution surface computed with the shadow of kernel G. Due to this property, it was determined that the mean-shift algorithm provides an efficient iterative method for determining a local mode of the target object. Therefore, the mean shift algorithm runs independently from each starting position. After convergence, the outcome from the mean shift algorithm is a number of local modes. Processing continues at block 408.

At block 414, a sparse set of local 2D modes is generated. In one embodiment (block 416), a mode is rejected if the corresponding state mode x' has a local evidence $p(y_i|x') \leq 0.5$. In a further refinement (block 418), very close modes may be merged. The outcome is a sparse set of local modes in each frame as shown in FIG. 5.

Figure 5:
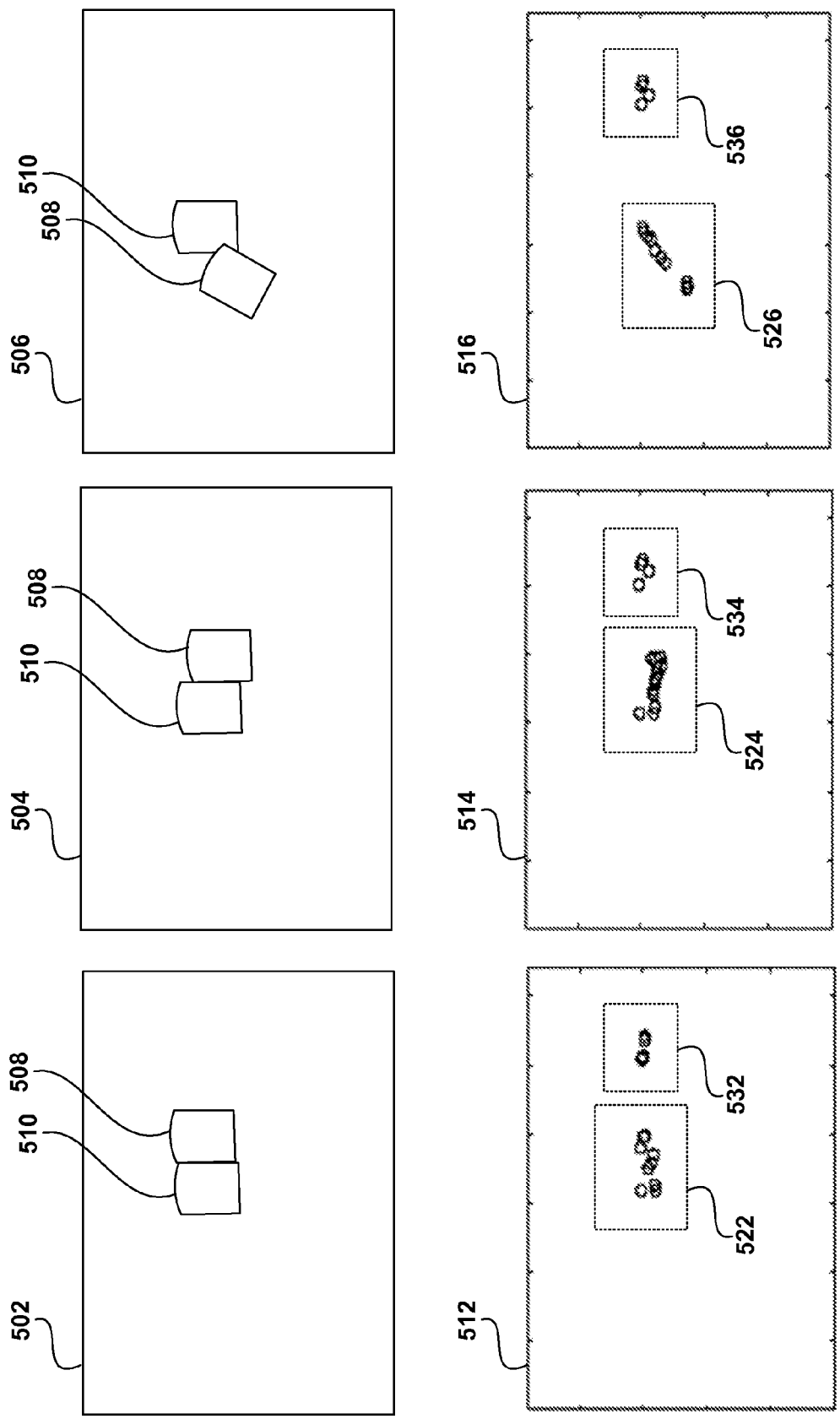
FIG. 5 is a set of exemplary illustrations where the top row displays simplified frames from a video sequence and the bottom row displays the outcome from the exemplary two-dimensional extraction process of FIG. 4.

Referring now to FIG. 5, a set of illustrations is shown. The top row displays simplified frames (e.g., frames 502, 504, 506) from a video sequence and the bottom row displays the outcome (e.g., sparse set of local 2D modes 512, 514, 516) from the two-dimensional extraction process described above in FIG. 4. The simplified frames show a target object 510 in relation to another object 508 that is identical to the target object (e.g., same color, same size). Even though the background details have been removed from the simplified frames, the present video tracking technique takes into account the background details during its processing. In overview, the video sequence illustrates a green cup 510 held by an individual (not shown) on the left side of each frame. The green cup 510 is the target object and is being tracked. Another individual (not shown) on the right side of each frame holds an identical cup 508. In frame 502, both individuals are holding their cups so that the cups are touching and are at the same height. In frame 504, the individual on the right has lowered cup 508. In frame 506, the individual on the right has moved cup 508 across the front of cup 510 and partially occluded the bottom left corner of cup 510. The present tracking technique has determined a set of local 2D modes 512, 514, 516 for each of the frames 502, 504, and 506, respectively. Groups 522, 524, 526 in the local 2D modes 512, 514, and 516, respectively, correspond to the two green cups (cups 508 and 510) in the image. Groups 532, 534, 536 in the local 2D modes 512, 514, and 516, respectively, correspond to a background region (not shown) in the corresponding frame that has similar color statistics as the object template (i.e., the green cup 510) in the keyframes.

The set of local 2D modes in each frame then represent the state space that is used for further tracking purposes in accordance with one embodiment of the present tracking technique. As illustrated by the set of local 2D modes 512-516, the state space has been significantly reduced. This reduction in state space allows further analysis for tracking purposes to be performed more efficiently. In contrast, other tracking techniques use the whole continuous state sequence space which has an enormous number of local minimums due to nonlinear dynamics and non-Gaussian observations. For example, gradient-based techniques often become stuck at a local minimum. Techniques that compute the MAP solution using the Viterbi algorithm using a discrete hidden markov model (HMM) representation must handle a large quantized state space, given a 320×240 video. Thus, the two-dimensional extraction process in the present tracking technique provides an efficient technique for significantly reducing the state space which leads to a more efficient tracking analysis.

Figure 6:
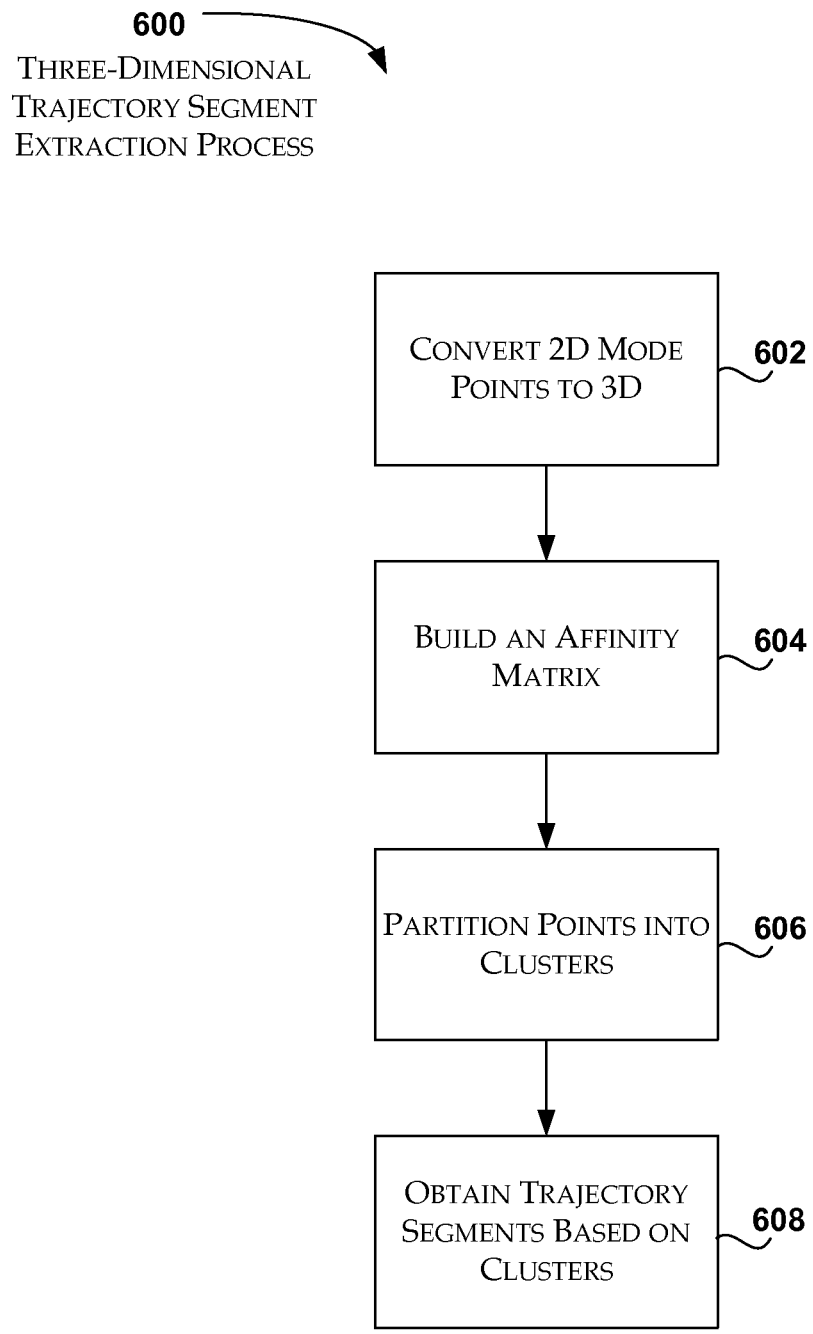
FIG. 6 is a flow diagram illustrating an exemplary three-dimensional trajectory segment extraction process using spectral clustering in accordance with one embodiment. This process is suitable for use in the exemplary trajectory segment analysis process of FIG. 3.

FIG. 6 is a flow diagram illustrating an exemplary three-dimensional trajectory segment extraction process suitable for use in block 304 in process 300 shown in FIG. 3. In overview, the trajectory segment analysis process 600 uses spectral clustering. Process 600 begins at block 602 where the two-dimensional mode points determined during the two-dimensional extraction process shown in FIG. 4 are converted into a three-dimensional volume. In order to obtain the true trajectory of target objects, especially if the target object follows a curved trajectory, the points are converted into the three-dimensional volume. For each 2D mode, a 3D point $m_n=[p_n,t_n]$ in the 3D video volume is obtained, where $p_n$ and $t_n$ are the spatial location and the temporal location (frame number), respectively. Processing continues at block 604.

At block 604, given a set of points $M=\{m_n\}_{n=1}^N$ in $\Re^3$, an affinity matrix is built where $\Re^3$ is the 3D euclidean space. In one embodiment, the basic affinity matrix $A \in \Re^{N \times N}$ is defined as follows:

$$A_{ij}=\exp(-\|p_i-p_j\|^2/2\sigma_p^2-\|t_i-t_j\|^2/2\sigma_t^2) \quad (9)$$

where the scaling parameters $\sigma_p$ and $\sigma_t$ control how rapidly the affinity matrix $A_{ij}$ falls off with the distance between two points $m_i$ and $m_j$ in space and time, respectively. In another embodiment of the present tracking technique, a more sophisticated but expensive affinity matrix $A_{ij}'$ may be used to encourage more compact trajectory segments. This affinity matrix $A_{ij}'$ may be defined as follows:

$$A_{ij}'=\alpha A_{ij}+(1-\alpha)\exp(-B^2[h(m_i),h(m_j)]/2\sigma_h^2). \quad (10)$$

The last term considers the similarity between the appearances (e.g., color histogram) of two modes ($m_i$, $m_j$). Variable α is a weighting factor. A suitable weighting factor may be a value of 0.5. Processing continues at block 606.

At block 606, the 3D points are partitioned into clusters. Various spectral clustering techniques may be used to partition the 3D points into clusters. These various spectral clustering techniques each analyze eigenvectors in slightly different ways. In one embodiment of the present video tracking technique, the Ng's algorithm is used which uses K eigenvectors simultaneously for K-class clustering. For this technique, a matrix $L=D^{-1/2}AD^{-1/2}$ is constructed where D is a diagonal matrix.

$$\left(D_{ii} = \sum_{j=1}^{N} A_{ij}\right).$$

Based on the largest eigenvectors of L, a matrix $E=[e_1, \Lambda, e_K] \in \Re^{N \times K}$ is computed, where $e_k$ is the set of normalized K largest eigenvectors of matrix L. Each row of matrix E is then treated as a point in $\Re^N$. A conventional K-means algorithm then clusters the points into K clusters. If row i of the matrix E is assigned to a cluster k, the original point is assigned to cluster k. Processing continues at block 608.

At block 608, the trajectory segments are obtained based on the clusters. For example, all 3D points in cluster k are treated as a trajectory segment $Tr_k$. This is done for all the clusters to obtain K trajectory segments $Tr=\{Tr_1, \Lambda, Tr_K\}$. Using the spectral clustering as described for the present video tracking technique, a number of "meaningful" trajectory segments are produced. Thus, the 3D trajectory extraction process successfully extracts a number of 3D object trajectories $Tr_k$ based on the 2D local modes M. Each object trajectory represents a possible segment of the tracked object in the 3D volume.

In comparison with other clustering techniques, this embodiment of spectral clustering embeds 3D data points on a surface of a unit sphere in a K dimensional space determined by the K largest eigenvectors of L. This allows curved trajectories or manifolds in the original 3D space to be separated which results in more meaningful trajectory segments. In contrast, every cluster determined using standard k-means clustering needs to be a convex region. Thus, the "true" trajectory can not be obtained if the trajectory is highly curved and/or some partition of the trajectory is not a convex region.

Once the trajectory segments have been extracted, an analysis is performed to determine the possibility that the target object may have been occluded during part(s) of the video sequence. This analysis, shown as block 208 in FIG. 2, is now described in more detail in conjunction with FIG. 7. If there is no occlusion of the target object, the extracted trajectory segments may be used for determining the state space sampling for trajectory optimization. However, typically, there will be a partial or complete occlusion of the target object during some part of the input video and processing proceeds to occlusion reasoning.

Figure 7:
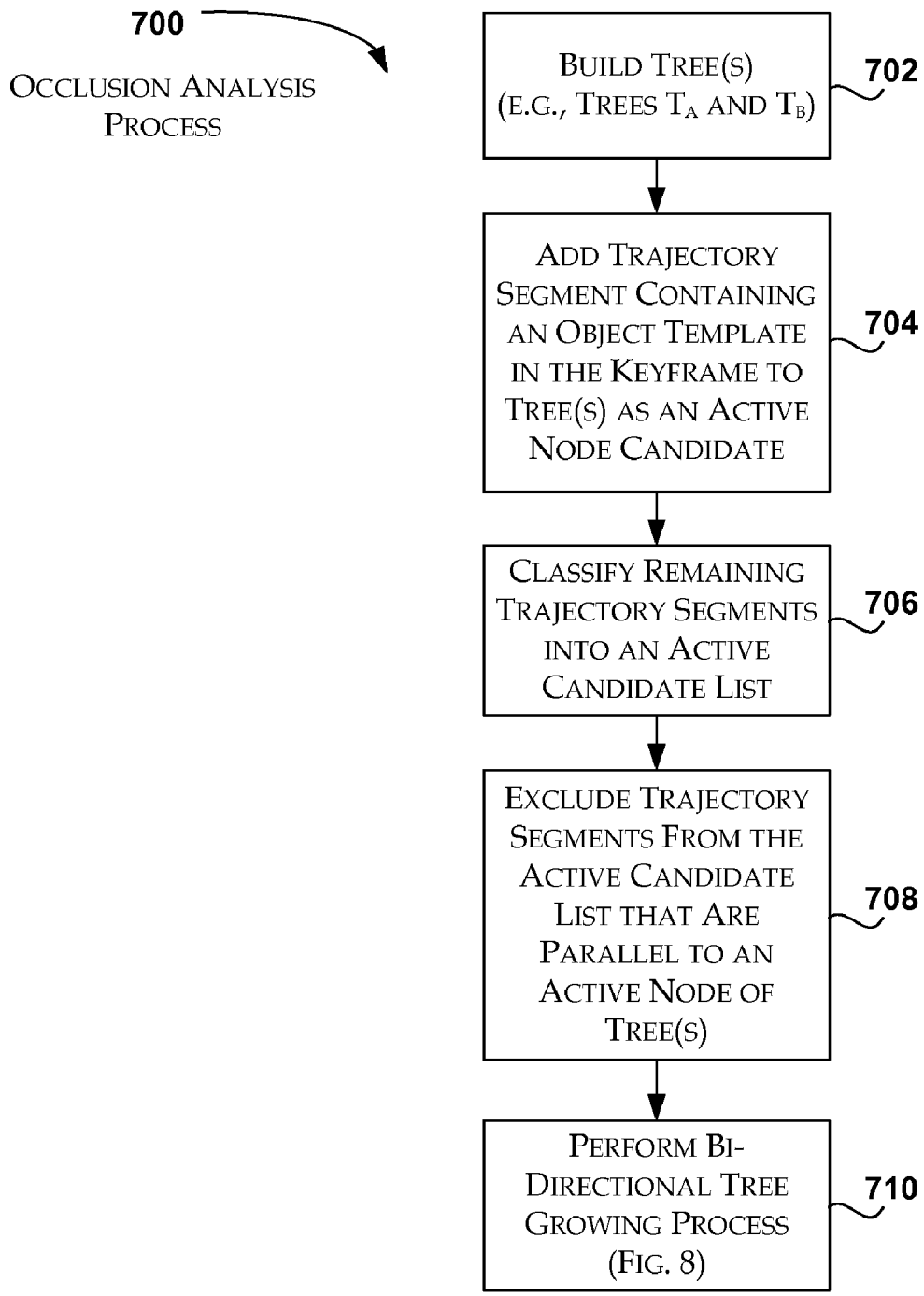
FIG. 7 is a flow diagram illustrating an exemplary occlusion analysis process in accordance with one embodiment. This process is suitable for use in the exemplary video tracking process of FIG. 2.

FIG. 7 is a flow diagram illustrating an exemplary occlusion analysis process suitable for use in the video tracking process of FIG. 2. Because partial or complete occlusion occurring in the input video is not included in the already extracted segments, additional occlusion trajectory segments need to be obtained. These occlusion trajectory segments then will correspond to the states during the occlusion stage. The occlusion analysis is based on several observations that were recognized while analyzing trajectory segments for a number of video sequences. These observations led to a bi-directional, tree-growing algorithm for the occlusion analysis. Before describing the occlusion analysis, the observations upon which it is based are first discussed. The occlusion segment is inferred and sampled between object trajectory segments. The trajectory segment that includes object template(s) in the keyframe(s) is in a "true" object trajectory. Any trajectory segment parallel to the segment which contains the object templates should be excluded. Two segments may be considered to be parallel if the overlapping time and the shortest distance between them are not more than a certain empirical threshold. There are no occlusion segments between two overlapping trajectory segments along the time axis. There are certain speed and time limits on each occlusion segment.

Based on these observations, the present bi-directional, tree-growing process for occlusion analysis was formulated. FIG. 7 is a flow diagram illustrating an exemplary occlusion analysis process suitable for use in block 208 of the video tracking process 200 shown in FIG. 2. Process 700 begins at block 702, where a tree is built. In one embodiment of process 700, process 700 may be performed using one tree which grows from either one of the two states (e.g., initial state or final state) obtained from the object template in the corresponding state. In another embodiment, process 700 may be performed using multiple trees. For example, if two trees are built, one tree grows from the initial state and the other tree grows from the final state. The trees will then meet to form the complete trajectory for the target object. The following discussion describes process 700 using two trees. As will be described, in this embodiment, information from the two trees can be shared to obtain a better determination for the complete trajectory. Thus, in block 702, two trees $T_A$ and $T_B$ are built. Both trees have an empty root node. In overview, the trees are used to determine the occlusion segments based on the trajectory segments that were previously identified. The occlusion segments then connect disjointed trajectory segment pairs. This is achieved by excluding a number of object trajectories from the tree and adding a number of occlusion trajectories to the tree as will be described below. Processing continues at block 704.

At block 704, a trajectory segment(s) is located that contain an object template in the keyframe. In the multiple tree embodiment, two such trajectory segments may be located and one of the trajectory segments is added to each tree $T_A$ and $T_B$ as an active node. Processing continues at block 706.

At block 706, the remaining trajectory segments are classified into an active candidate list. In overview, the segments in the active candidate list are then either excluded or used to determine an occlusion segment. Processing continues at block 708.

At block 708, trajectory segments in the active candidate list that are parallel to an active node are removed from the active candidate list. Two segments are parallel if the overlapping time and the shortest distance between them are not more than certain empirical thresholds. In one exemplary implementation, the time threshold is 30 frames and the distance threshold is 50 pixels. Processing continues at block 710.

At block 710, a bi-directional tree-growing process is performed. In overview, the bi-directional tree-growing process, described later in conjunction with FIG. 8, grows the tree(s) one step at a time until there are no active leaf-nodes in the tree(s). The tree-growing process determines the possible occlusion segments. Once block 710 is complete, the occlusion analysis process 700 is also complete.

Figure 8:
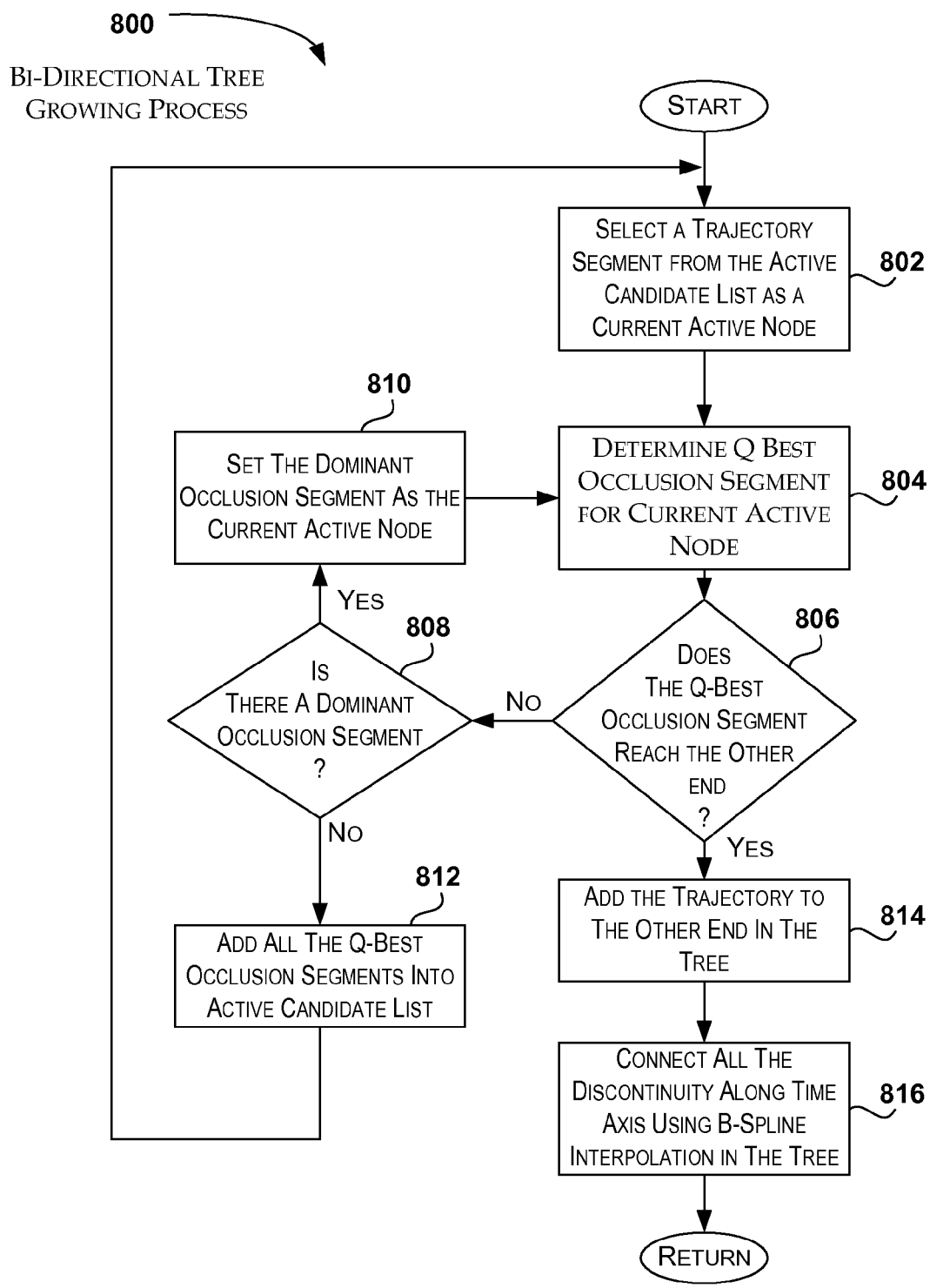
FIG. 8 is a flow diagram illustrating an exemplary bi-directional tree growing process in accordance with one embodiment. This process is suitable for use in the exemplary occlusion analysis process of FIG. 7.

FIG. 8 is a flow diagram illustrating an exemplary bi-directional tree growing process 800 suitable for use in the occlusion analysis process shown in FIG. 7. Process 800 is performed on each active leaf node that does not have a child node. Process 800 may be performed for each tree. Processing begins at block 802.

At block 802, a trajectory segment from the active candidate list is selected as a current active node (i.e., an active leaf node of the previous active node). The selected active leaf node does not have a child node at this point. Processing continues at block 804. Processing continues at block 804.

At block 804, Q-best occlusion segments for the current active node are determined. A forward search may be performed in the active candidate list to identify trajectory segments Tr* that overlap other trajectory segments along the time axis. The Q-best occlusion segments may then be generated between the trajectory segment of the active leaf node $Tr^a$ and each of these identified trajectory segments Tr*. In one embodiment, the Q-best occlusion segments are determined based on $L_o + \gamma S_o$, where $\gamma = 10$ is a weighting factor. $L_o$ and $S_o$ are the length (pixel) and maximum speed (pixel× frame$^{-1}$) of the hypothesized B-spline between two connected trajectory segments. In overview, the B-spline is used to generate a missing occlusion segment O with respect to two disjoint trajectories $T_{r_1}$ and $T_{r_2}$ in time. Given all points $\{m_j = [p_j, t_j]\}_{j=1}^{N'}$ in $T_{r_1}$ and $T_{r_2}$, a B-spline is fit, where the B-spline $$r(s) = \sum_{n=0}^{N_B} B_n(s) q_n$$

uses weighted least squares:

$$\min_{\{q_n\}} \sum_{j=1}^{N'} \omega(m_j) \|r(s'_j) - m_j\|^2 \quad (11)$$

where $s'_j = (t_j - t_1)/N'$ is a temporal parameterization of the B-spline in frame $t_j$. Even though the parameterization of the B-spine is an approximation, it was found to yield good results.

The weighting function $\omega(m_j)$ is defined as:

$$\omega(m_j) = \begin{cases} \exp(-\sigma_\omega^{-1} \|t_j - t_A^e\|) j \in Tr_1 \\ \exp(-\sigma_\omega^{-1} \|t_j - t_B^s\|) j \in Tr_2 \end{cases}, \quad (12)$$

where $t_A^e$ and $t_B^s$ are the last frame number in $Tr_1$ and the first frame number in $Tr_2$. The scaling parameter $\sigma_\omega$ is set to 20. Using a weighting function, a larger weight can be given to a point nearby $t_A^{end}$ and $t_B^{start}$. Finally, the fitted B-spline curve between $Tr_1$ and $Tr_2$ is sampled as the occlusion segment O. Processing continues at decision block 806.

At decision block 806, a determination is made whether any one of the Q-best occlusion segments reach the other end. In other words, whether one of the occlusion segments meets up with the trajectory segment set as the current active node in the other tree. The current active node in the other tree may be the trajectory segment containing the object template or one of the other trajectory segments set as the active node during processing of the other tree. If one of the Q-best occlusion segments reaches the other end, processing continues at block 814. Otherwise, processing continues at decision block 808.

At decision block 808, a determination is made whether one of the Q-best occlusion segments is a dominant occlusion segment. This optional determination is based on whether one of the trajectory segments has a value for $L_o + \gamma S_o$ that is significantly smaller than the values for the other trajectory segments. If there is a dominant occlusion segment, processing continues at block 810. Otherwise, processing continues at block 812.

At block 810, the dominant Q-Best occlusion segment is added as a child node and set as the current active node. The previous active current node is set as inactive because it now has a child node. Processing then continues at block 804 with this current active node.

At block 812, if there is not a dominant Q-best occlusion segment, each of the Q-best occlusion segments are added to the active candidate list. By doing so, multiple occlusion segments may be joined until one can be joined with a trajectory segment. Processing then loops back to block 802 to select a "segment" (e.g., either an occlusion segment or a trajectory segment) from the active candidate list and proceeds as described above.

At block 814, if one of the Q-best occlusion segments reaches the other end, the occlusion segment is added to the other end in the tree. In the embodiment with two trees, the occlusion segment is added to both trees and set as inactive. The occlusion segment is then a bridge between the two trees. Processing continues at block 816.

At block 816, the discontinuities along the time axis are connected using B-spline interpolation in the tree. The result is a possible trajectory path from the initial state to the final state that includes trajectory segments and occlusion segments. Processing is then complete.

Process 800 is performed for each child node that does not have any children. Once a child node has a child (e.g., at least one Q-best occlusion segment), processing for that node is complete. When there are no longer any active nodes in either tree or trajectories that have been identified that connect the initial state to the final state, process 800 is complete. One will note that trajectory segments connect with occlusion segments because during the trajectory segment analysis process 300 the longest possible trajectory segments were obtained. Therefore, typically, trajectory segments do not connect with other trajectory segments.

Figure 9:
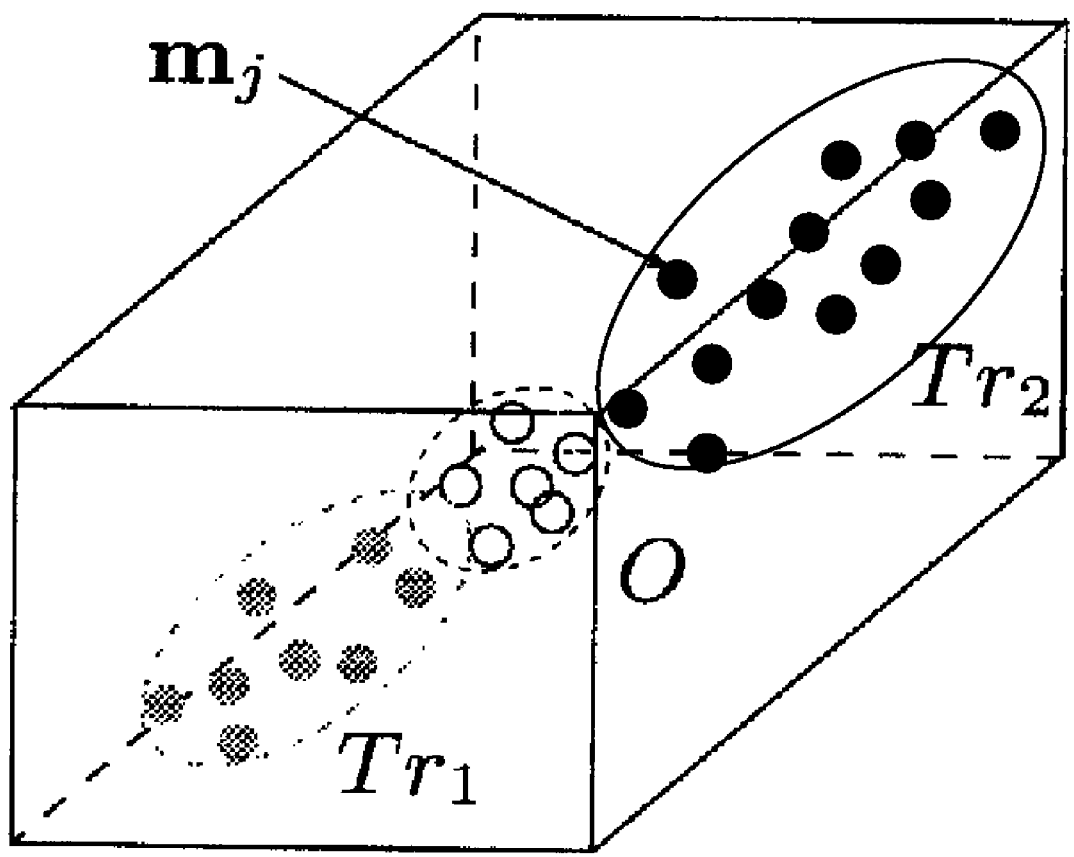
FIG. 9 is a graphic depicting an exemplary occlusion trajectory generated during the occlusion analysis process shown in FIG. 7.

FIG. 9 is a graphic depicting an occlusion trajectory segment generated during the occlusion analysis process shown in FIG. 7. As shown, there are two trajectory segments $Tr_1$ and $Tr_2$. Point $m_j$ is a 2D local mode and $Tr_1$ and $Tr_2$ are 3D trajectory segments in the 3D video volume. O is an inferred occlusion trajectory segment between trajectory segments $Tr_1$ and $Tr_2$.

After getting a set of object trajectories and occlusion trajectories, a single optimal trajectory between two keyframes is computed by sampling these trajectories in accordance with the present video tracking technique using trajectory optimization (block 210 in FIG. 2). The present video tracking technique performs trajectory optimization in order to obtain more accurate tracking results. The trajectory optimization performs the above equation (3) in a coarse-to-fine manner. In one embodiment, two levels may be selected for the coarse-to-fine manner. A first level (i.e., a coarse level) in which the sample is spatially down-sampled, the M (e.g., 500-1000) states around the computed segments may be uniformly sampled using three discrete scaling factors s in each frame. These states may be selected within a small radius from the segments, such as a radius of 5 pixels. An optimal trajectory is computed in this coarse level using a conventional discrete Hidden Markov Model (HMM). Using the optimal trajectory computed from this coarse level, a next level (i.e., a fine level) is used to determine the final optimal trajectory. The next level may sample the M states around the optimal solution using five discrete scaling factors in each frame. Even though the fine level uses five discrete scaling factors in each frame, the computation is not prohibitive because the number of states has been dramatically decreased. For example, for a 10 second video, the trajectory optimization takes approximately eight seconds.

Figure 14:
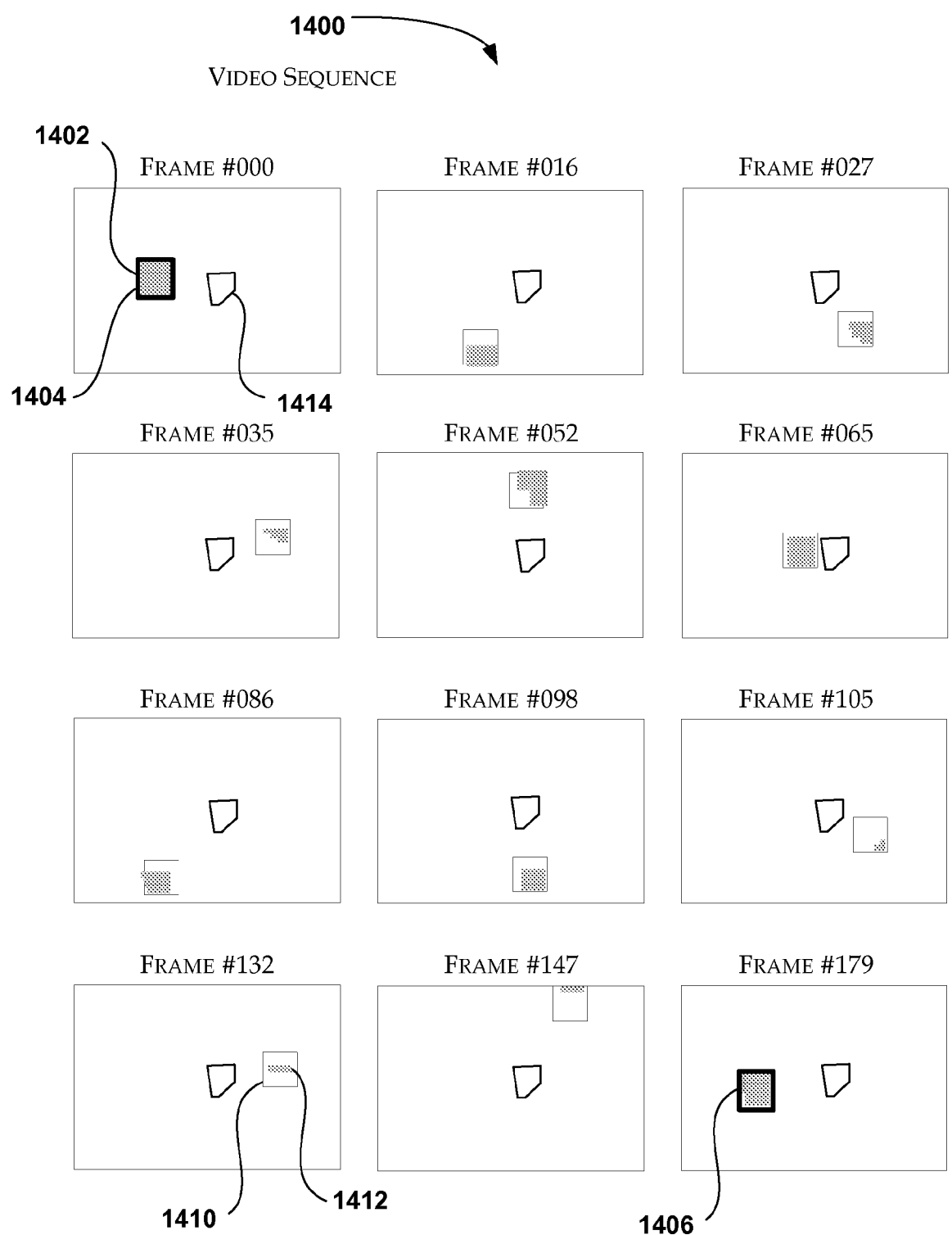
FIG. 14 illustrates several simplified exemplary frames from a video sequence that are used as input in the various stages of processing in accordance with one embodiment of the present tracking technique. In this example, the various stages of processing produce the set of graphics in FIGS. 10-13.

FIGS. 10-13 is a set of graphics 1000, 1100, 1200, and 1300 that illustrate outcomes at various stages of processing in accordance with the present tracking technique. Simplified frames from a video sequence 1400 that resulted in graphics 1000, 1100, 1200, and 1300 are illustrated in FIG. 14. Start frame (#000) designates an initial state 1402 for a target object 1404 and end frame (#179) designates a final state 1406 for the target object. In overview, video sequence 1400 illustrates the movement of two identical cups. The simplified frames do not illustrate the background, but rather focus on the movement of the identical cups in relation with each other. In frame #000, an individual (not shown) holds two identical cups 1404 and 1414 so that cup 1404 is approximately half the cup length higher then cup 1414. Cup 1414 is partially occluded in the lower right corner and remains approximately in the same position for all the frames in the video sequence 1400. In contrast, cup 1404 moves in each frame. The movement of cup 1404 in the frames is now described. One will note that each frame as a rectangular box 1410 that denotes the predicted position of the target object determined in accordance with the present tracking technique. Each frame also illustrates a shaded area 1412 that represents the actual position of the target object within the frame. Due to occlusion of the target object, the size of the shaded area 1412 varies depending on the extent of occlusion of the target object.

Figure 10:
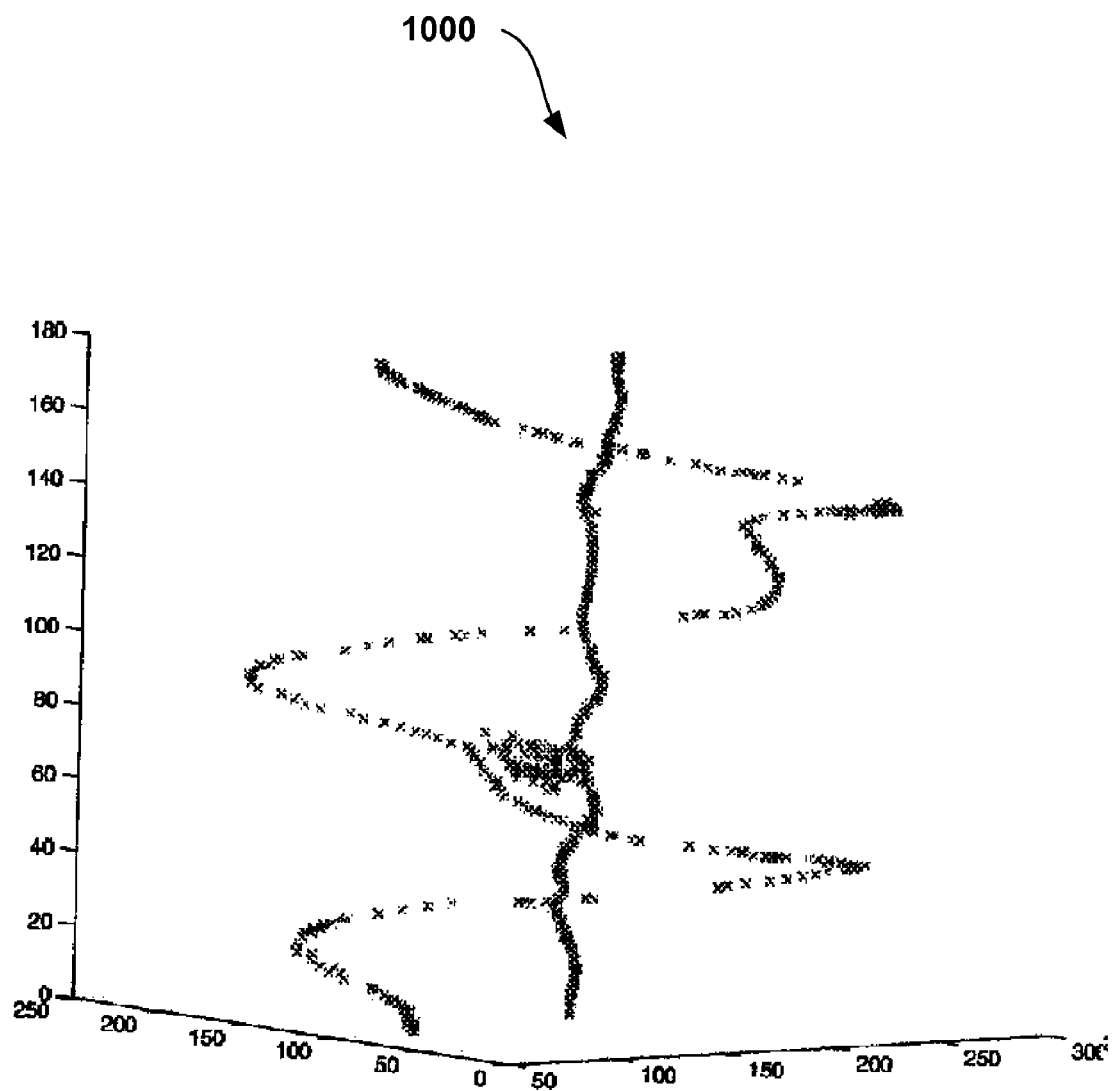
FIGS. 10-13 is a set of exemplary graphics that illustrate the outcome at various stages of processing in accordance with one embodiment of the present tracking technique.
Figure 11:
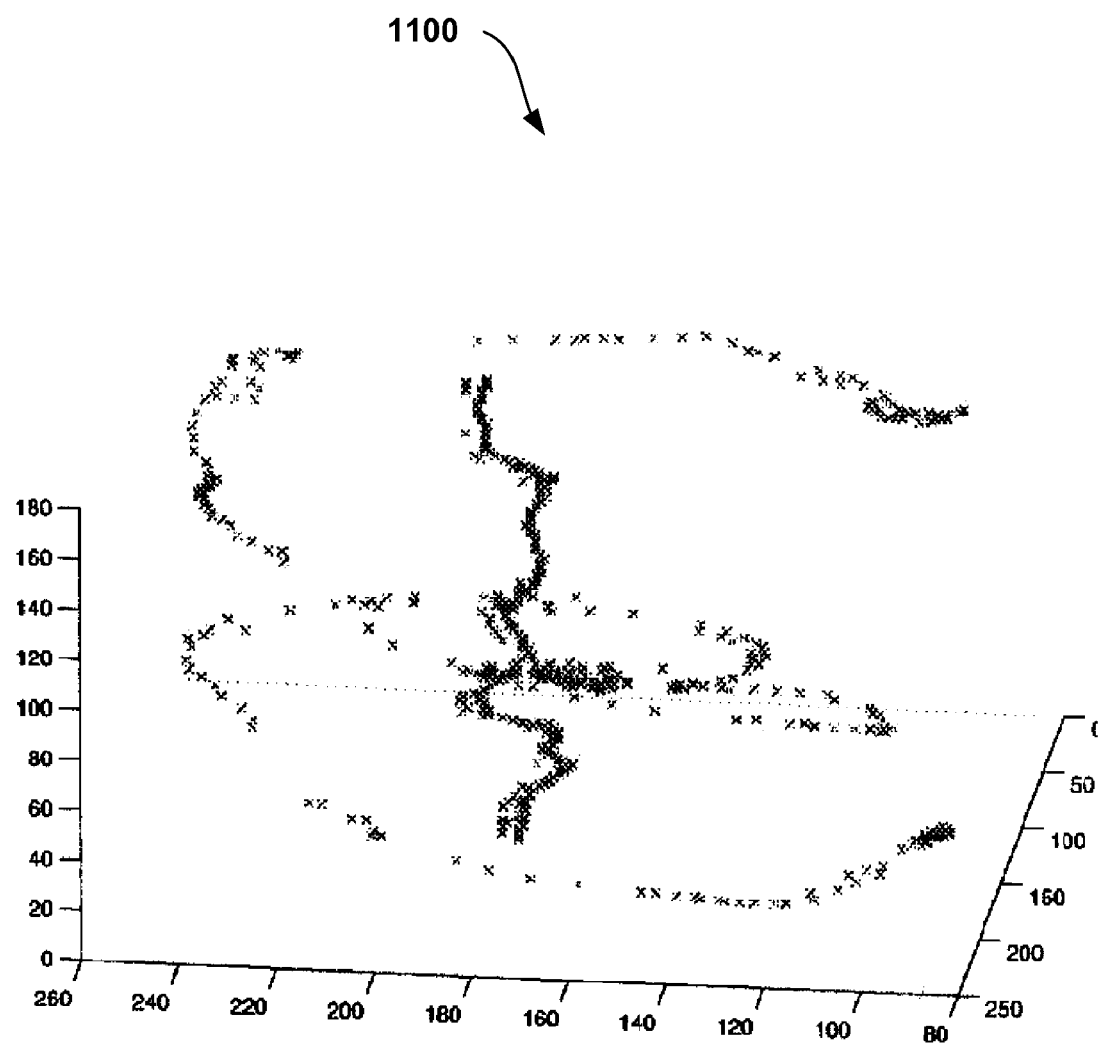
Figure 12:
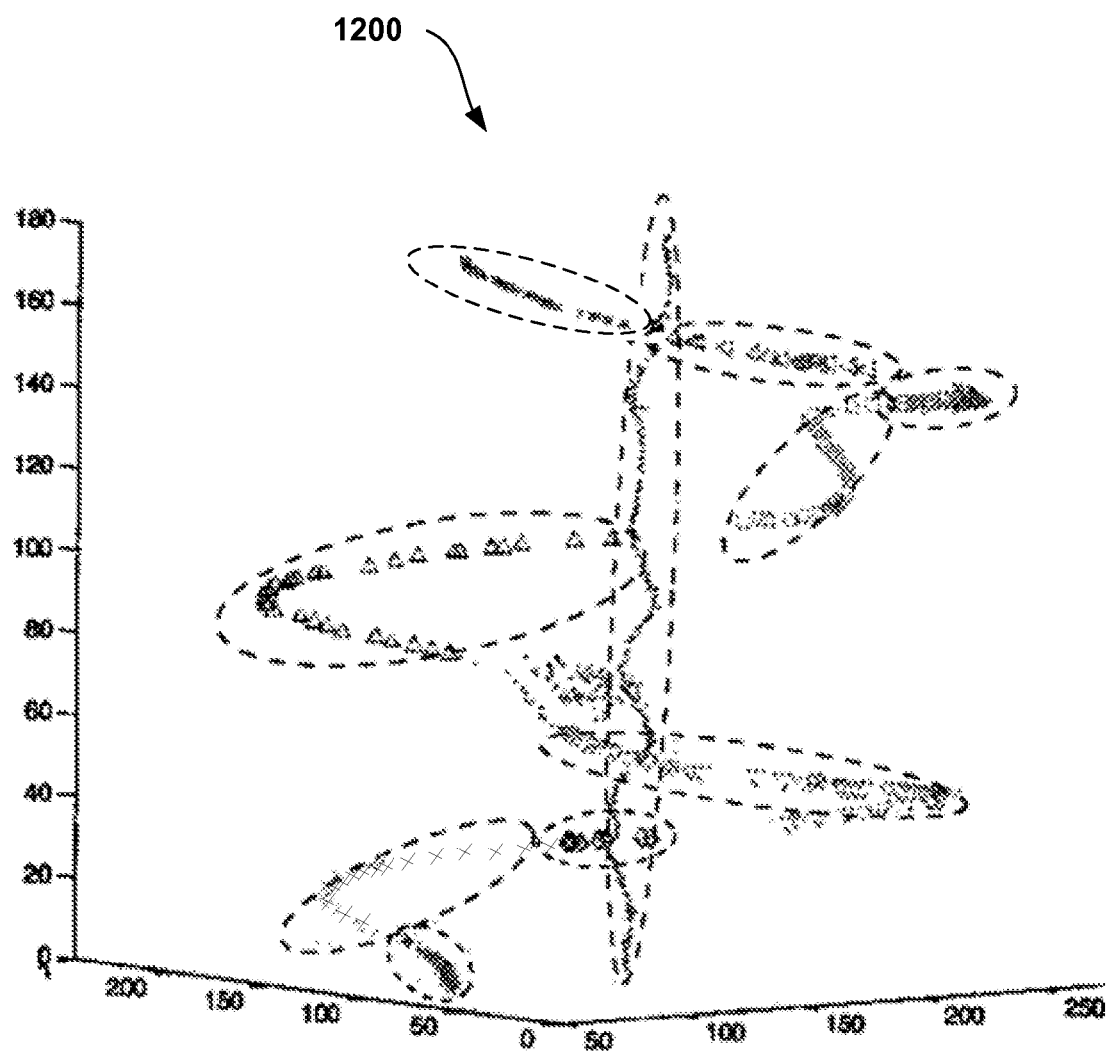
Figure 13:
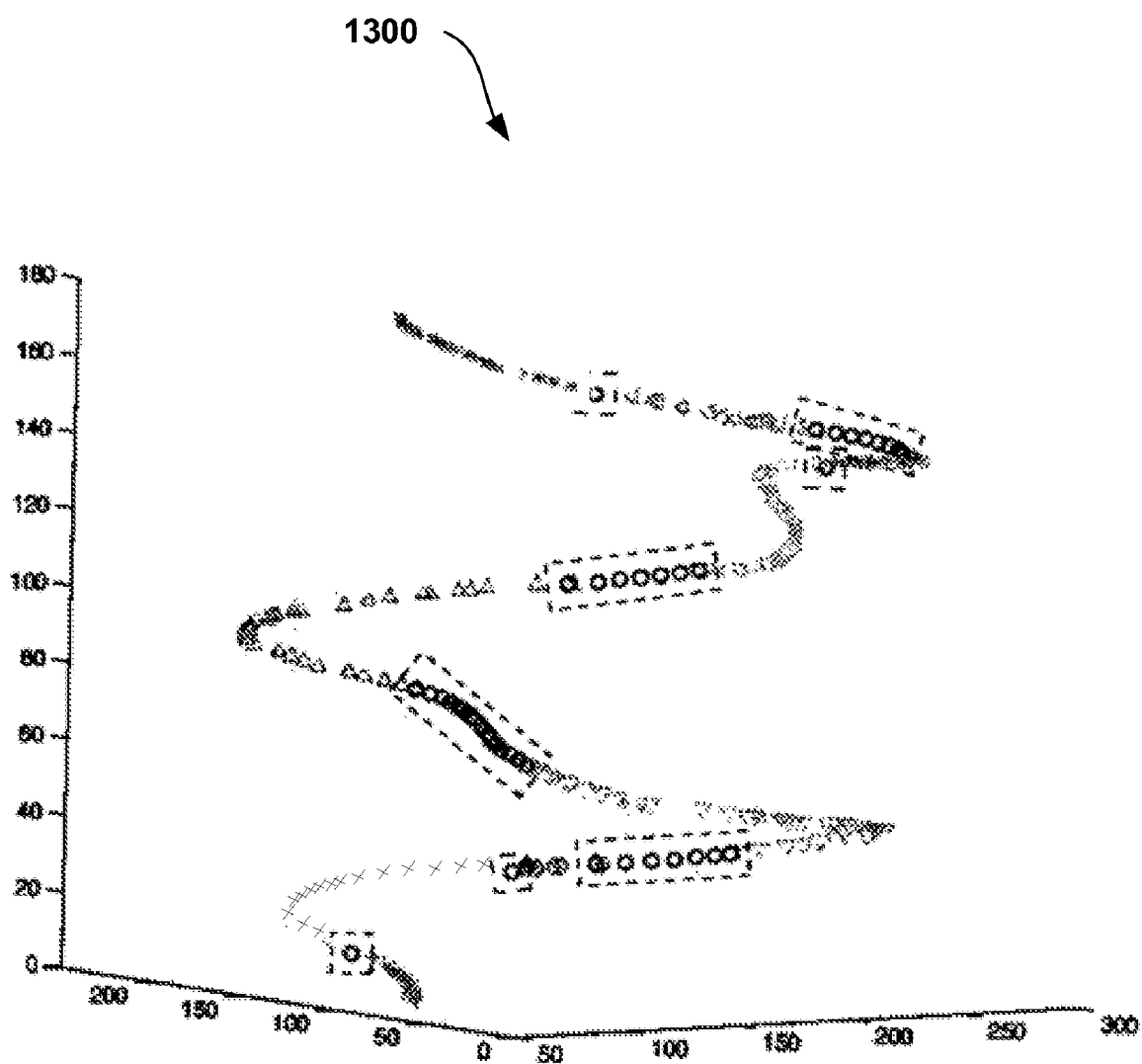

In frame #016, cup 1404 is moved vertically down so that it is lower than cup 1414. In frame #027, cup 1404 is moved right so that it is below and to the right of cup 1414. During frames #028-035, cup 1404 is moved under the individuals arm holding cup 1414 and ends at a position to the right and slightly higher than cup 1414. Because cup 1404 is behind the left arm of the individual, there is considerable occlusion, as shown in frame #035. In frame #052, cup 1404 is moved up and approximately directly over cup 1414. In frame #065, cup 1404 is positioned at the same height as cup 1414 and to the left of cup 1414, with little occlusion. In frame #086, cup 1404 is lowered and moved slightly to the left in the frame. In frame #098, cup 1404 is positioned below cup 1414 and is partially occluded due to the individual's hand (not shown) in front of cup 1404. In frame #105, cup 1404 is moved behind the individuals left arm which is holding cup 1414. Therefore, cup 1404 is almost completely occluded. Interestingly, however, the predicted location 1410 accurately predicts the location of where cup 1404 would be located. In frame #132, cup 1404 is raised slightly so that a small portion can be seen over the individual's left arm (not shown). In frame #147, cup 1404 is moved to the top of the frame and is almost completely occluded by the individual's fingers holding cup 1404. Thus, as illustrated by the video sequence 1410, the present tracking technique accurately predicted the position of the target object even when the target object became completely occluded. The results of the present tracking technique at various stages during processing are illustrated in FIG. 10.

Graphics 1000 and 1100 illustrate two views of the 2D mode in 3D, where the 2D mode points were generated during the two-dimensional extraction process of the present tracking technique. The vertical axis is the frame number in the sequence. The other axis are the x,y position of the target object in each frame. The fairly straight line down the center corresponds to the identical cup 1414 in video sequence 1400. Graphic 1200 illustrates meaningful trajectory segments obtained after performing the three dimensional trajectory segment analysis with spectral clustering. Because the target object was complete occluded during portions of the video sequence, there is not one trajectory from the initial state to the final state. Graphic 1300 illustrates an optimal trajectory for the target object after the occlusion analysis has been performed. The circles within the dashed rectangles represent the filled-in occlusion segments.

Thus, as described, the present tracking technique successfully handles partial or complete occlusions. The tracking technique employs an innovative trajectory segment representation to obtain a small number of trajectory segments out of the possible object trajectories in the 3D video volume. The trajectory segments are extracted from the input video using a spectral clustering method. With this representation, the MAP solution is obtained by employing a discrete Hidden Markov Model in a coarse-to-fine manner using the trajectory segments. In addition, the present tracking technique employs an occlusion analysis process to robustly infer possible occlusion trajectory segments of the target object.

Typical, parameter settings that may be used for the present tracking technique are now discussed. The selection of the cluster number K is an open problem in clustering. Because there is a grouping mechanism in the occlusion analysis of the present tracking technique, it was determined that a slightly larger K than the "best" one is acceptable. Therefore, the clustering number K may be set so that K=7 or K=10. In 2D mode extraction, G is a Gaussian kernel whose standard deviation may be about ⅙ the size of the target object in the keyframe. In the 3D trajectory extraction, scaling parameters $\sigma_p$ and $\sigma_t$ may be set to 10 and 20, respectively. In trajectory optimization, the variance parameters $\sigma_h$ and $\sigma_p$ may be set to 10 and 1, respectively.

As described above, the present bi-directional tracking using trajectory analysis takes the whole video sequence and the information in two keyframes as inputs and outputs the MAP solution of the whole state sequence of the target object in the Bayesian framework. Bi-directional tracking is based on trajectory analysis which extracts a number of 3D trajectories, a compact representation for object tracking, from the input video. Then, the occlusion trajectories are inferred at the trajectory-level. Finally, the MAP solution is obtained by trajectory optimization in a coarse-to-fine manner. Experimental results show the robustness of the present technique with respect to sudden motion, ambiguity, short-time and long-time occlusion.

The present bi-directional tracking technique may be applied in many offline applications. One new area in which it may be applied is online advertisements. For this application, a moving target may be "clicked" to automatically link to a related website. Because the present bi-directional tracking technique accurately tracks the target object, the position of the moving target object may be given to a potential application for its own use. This and many other applications are envisioned for the present tracking technique.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. At least one computer-readable storage medium storing computer-executable instructions for performing a method, the method comprising:
   determining two keyframes of a video sequence;
   obtaining a first state for a target object within one of the two keyframes and a second state for the target object within the other keyframe; and
   tracking the target object in the frames from the one keyframe to the other keyframe based on the first and second state the tracking comprising:
      performing two-dimensional extraction on the frames to obtain a plurality of local two-dimensional (2D) modes for the target object, the performing two-dimensional extraction including computing an evidence surface and applying a mean shift algorithm to compute a gradient direction of the computed evidence surface that results in the local 2D modes for the target object;
      performing three-dimensional trajectory segment extraction based on the sparse set of local 2D modes to obtain a plurality of three-dimensional trajectory segments for the target object; and
      performing trajectory optimization in a coarse to fine manner to obtain an optimal trajectory for the target object based on the trajectory segments.

2. The computer-readable storage medium of claim 1, wherein the tracking of the target object comprises:
   performing occlusion analysis based on the plurality of trajectory segments to obtain at least one occlusion segment that connects two disjoint trajectory segments of the plurality of trajectory segments; and
   performing trajectory optimization in a coarse to fine manner to obtain an optimal trajectory for the target object based on the trajectory segments and the occlusion segment.

3. The computer-readable storage medium of claim 2, wherein three-dimensional trajectory segment extraction comprises:
   converting the 2D modes into three-dimensional points within a three-dimensional volume;
   partitioning the three-dimensional points into clusters using a spectral clustering technique that uses K eigenvectors simultaneously for K-class clustering; and
   obtaining meaningful trajectory segments based on the clusters.

4. A computer-implemented method comprising:
   designating by a computing device, a start and an end frame within a video sequence;
   obtaining, by the computing device, an initial state for a target object within the start frame and a final state for the target object within the end frame;
   performing, by the computing device, two-dimensional extraction on the frames starting with the start frame and ending with the end frame to obtain a sparse set of local two-dimensional (2D) modes for the target object in the frames based on the initial state and the final state, the performing two-dimensional extraction comprising:
      computing an evidence surface; and
      applying a mean shift algorithm to compute a gradient direction of the computed evidence surface that results in the local 2D modes for the target object; and
   performing, by the computing device, three-dimensional trajectory segment extraction based on the sparse set of local 2D modes to obtain a plurality of three-dimensional trajectory segments for the target object.

5. The computer-implemented method of claim 4, further comprising pre-filtering the frames using a color histogram of the target object before applying the mean shift algorithm.

6. The computer-implemented method of claim 4, further comprising determining a plurality of starting positions by uniformly sampling locations in the frame and running the mean shift algorithm independently from each starting position.

7. The computer-implemented method of claim 6, wherein uniformly sampling comprises setting a spatial sampling interval to be smaller than half the size of the target object.

8. The computer-implemented method of claim 4, further comprising rejecting one of the local 2D modes if a corresponding evidence is less than a pre-determined value.

9. The computer-implemented method of claim 4, further comprising merging local 2D modes into one local 2D mode when the two local 2D modes are within a certain distance of each other.

10. The computer-implemented method of claim 4, wherein performing three-dimensional trajectory segment extraction comprises:
    converting the 2D modes into three-dimensional points within a three-dimensional volume;
    partitioning the three-dimensional points into clusters using a spectral clustering technique that uses K eigenvectors simultaneously for K-class clustering; and
    obtaining meaningful trajectory segments based on the clusters.

11. The computer-implemented method of claim 10, further comprising performing occlusion analysis based on the plurality of trajectory segments to obtain at least one occlusion trajectory segment that connects two disjoint trajectory segments of the plurality of trajectory segments.

12. The computer-implemented method of claim 11, wherein performing occlusion analysis comprises:
    building a tree with an empty root node for the tree;
    adding one trajectory containing an object template in the key frame to the tree as an active node;
    adding remaining trajectories to a candidate list;
    excluding trajectories in the candidate list based on whether the trajectories are parallel to the trajectory that corresponds to the active node;
    while there is an active node in the tree, selecting one of the trajectories from the candidate list as a current active node;
    determining at least one Q-best occlusion segment;
    adding the at least one Q-best occlusion segment to the candidate list if the Q-best segment does not reach a desired trajectory segment;
    repeating e-g until identifying when the Q-best segment reaches the desired trajectory segment; and
    connecting the trajectories and the Q-best occlusion segment to make a complete trajectory for the target object.

13. The computer-implemented method of claim 11, further comprising performing trajectory optimization in a coarse to fine manner to obtain an optimal trajectory for the target object based on the meaningful trajectory segments and the occlusion trajectory segment.

14. The computer-implemented method of claim 13, wherein performing the trajectory optimization in the coarse manner comprises spatially down-sampling the frames and uniformly sampling the positions around the trajectory segments in each frame using three discrete scaling factors to obtain the optimal trajectory.

15. The computer-implemented method of claim 4, wherein performing the trajectory optimization in the fine manner comprises uniformly sampling the positions around the optimal trajectory using five discrete levels of scaling factors in each frame to obtain a final optimal trajectory.

16. A computing device, comprising:
a processor;
a memory into which a plurality of instructions are loaded, the plurality of instructions performing a method for tracking a target object within a video sequence when executed by the processor, the video sequence being decomposed into several short sequences, the shorter sequences having a start frame and an end frame, the method comprising:
generating a set of local two-dimensional (2D) modes for each frame of one short sequence, each local 2D mode identifying a location within the frame that has visual statistics similar to the target object identified in the start frame, the generating including computing an evidence surface and applying a mean shift algorithm to compute a gradient direction of the computed evidence surface that results in the local 2D modes for the target object;
obtaining a plurality of three-dimensional trajectory segments for the target object based on the set of local 2D modes;
obtaining at least one occlusion segment that connects two disjointed trajectory segments of the plurality of three-dimensional trajectory segments; and
determining an optimal trajectory based on the plurality of three-dimensional trajectory segments and the at least one occlusion segment.

17. The system of claim 16, wherein obtaining the plurality of three-dimensional trajectory segments comprises converting the set of local 2D modes into three-dimensional points in a three-dimensional volume, partitioning the three-dimensional points into clusters using spectral clustering, and obtaining the three-dimensional trajectory segments based on the clusters.

18. The system of claim 17, wherein obtaining the at least one occlusion segment comprises performing a bi-directional tree-growing process.

* * * * *